(No Model.)
W. F. WINEBERGER.
ANTI RATTLER FOR THILL COUPLINGS.
No. 246,056. Patented Aug. 23, 1881.
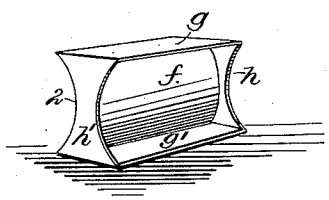
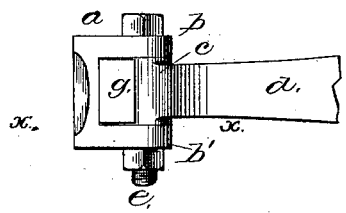
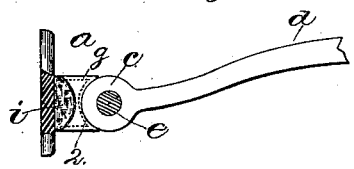
Witnesses.
Inventor:
William F. Wineberger
by Crosby Gregory Attys

UNITED STATES PATENT OFFICE.

WILLIAM F. WINEBERGER, OF QUINCY, MASSACHUSETTS.

ANTI-RATTLER FOR THILL-COUPLINGS.

SPECIFICATION forming part of Letters Patent No. 246,056, dated August 23, 1881.

Application filed July 5, 1881. (No model.)

*To all whom it may concern:*

Be it known that I, WILLIAM F. WINEBERGER, of Quincy, county of Norfolk, State of Massachusetts, have invented an Improvement in Anti-Rattlers, of which the following description, in connection with the accompanying drawings, is a specification.

My invention has for its object to produce a device that can be used in connection with the ordinary forms of thill-coupling to prevent rattling, owing to the looseness of the parts connecting the thill or shaft iron to the axle.

In the usual form of thill-coupling the axle is provided with a connecting-piece having two lugs, between which the shaft-eye is received, the said lugs and eye being provided with a cylindrical passage for a bolt, by which they are connected together, and upon which, as a pivot, the said shaft-eye and shaft is free to turn. In couplings of this kind when the bolt or bolt-hole has become somewhat worn it fits loosely, and a disagreeable rattling noise is consequently produced when the vehicle is in motion.

My invention consists in a novel form of cushioning-spring interposed between the shaft-eye and portion of the coupling connected to the axle to always hold the said shaft-eye pressed against the connecting-bolt, and to thus prevent all rattling of the said parts. The said spring consists of a block of rubber of suitable form confined in a bearing-block having a bearing-surface corresponding to and bearing upon the shaft-eye, and provided with flanges on all four sides to contain the block of rubber and confine its elastic action to the direct line between the shaft-eye and portion of the coupling connected with the axle.

I am aware that a similar bearing-block has previously been used having two flanges, one at the top and the other at the bottom, and an opening or slot to receive a secondary rubber cushion, which bears directly upon the thill-eye; but in such construction the rubber bearing against the thill-eye soon becomes worn away, and if the main rubber spring is sufficiently compressed to act effectively it will spread the two flanges of the bearing-block apart and become inoperative, a thing which cannot take place in my improved coupling, as the said upper and under flanges are connected by transverse flanges or ribs at their ends, and thus held together with sufficient strength to properly confine the rubber.

Figure 1 is a perspective view of a flanged bearing-block embodying my invention; Fig. 2, an end elevation of the rubber spring to be used in connection therewith; Fig. 3, a top view of a thill-coupling provided with my improved anti-rattling device; and Fig. 4, a vertical section thereof on line $x\ x$, Fig. 3.

The coupling, as shown in Figs. 3 and 4, consists of the usual connecting-piece, $a$, adapted to be fixed upon the axle, and provided with two lugs, $b\ b'$, between which the eye portion $c$ of the usual shaft-iron, $d$, is received, the said shaft-iron being connected with the said lugs by the bolt $e$.

The anti-rattling device forming the subject of the present invention consists, partly, of the bearing-box $f$, of metal, having a bearing-surface, 2, of proper shape to fit the rear side of the shaft-eye $c$, as shown in Fig. 4, and flanges $g\ g'$ extended backward therefrom at its top and bottom, and connected by flanges $h\ h'$ at the ends of the said curved bearing portion 2, thus forming at the rear side of the bearing-box, as shown in Fig. 1, a socket to receive the rubber spring $i$, (shown in Fig. 2,) which forms the other part of the anti-rattling device. The said rubber spring is of such thickness that when placed in the socket of the bearing-box $f$, and with it placed between the portion $a$ of the thill-coupling and the shaft-eye $c$, as shown in Figs. 3 and 4, it will be considerably compressed, and thus hold the shaft-eye forcibly pressed against the bolt $e$, and the latter against the front edge of the bolt-holes on the lugs $b\ b'$, so that no rattling can ensue.

In order to entirely prevent rattling, the spring $i$ has to be considerably compressed, and soft rubber, when thus compressed, will react in all directions, so that a considerable strain is brought against the flanges $g\ g'$ of the bearing-box $f$; and I have discovered by experiment that when such flanges are used only at the top and bottom of the box $f$ it is impossible to make them strong enough to resist the pressure of the spring $i$ when sufficiently great to prevent rattling. I have found, however, that by making the block of cast brass, as shown in Fig. 1, and providing it with the flanges $h\ h'$ at its ends, the flanges $g\ g'$ will be sufficiently strengthened to resist the pressure of the rubber and confine its action wholly between the bearing-surface 2 of the block $f$ and the portion $a$ of the coupling connected with the axle.

The bearing-block $f$ and rubber springs $i$ can be constructed to fit the standard sizes of thill-couplings, such as shown in Figs. 3 and 4, and can be readily applied to such couplings already in use.

The flanges $h\ h'$ need only be sufficient to properly strengthen the flanges $g\ g'$, as the rubber will be prevented from spreading endwise by the lugs $b\ b'$ of the portion $a$ of the coupling.

I claim—

1. As an improved article of manufacture, the herein-described device to prevent rattling of a thill-coupling, it consisting of the rubber spring $i$ and bearing-box $f$, having a curved bearing-surface to engage the shaft-eye, flanges $g\ g'$, to receive the rubber and confine its expansive action to the said bearing-surfaces, and strengthening-flanges $h\ h'$, connecting the said flanges $g\ g'$ to enable them to sustain the pressure of the said spring $i$, substantially as described.

2. The combination, with the fixed portion $a$ of a thill-coupling and the shaft-eye bolted thereto, of the bearing-box $f$, with its flanges $g\ g'$ and $h\ h'$, and the rubber spring $i$, contained within the said box and its flanges and acting between it and the portion $a$ of the coupling, substantially as described.

In testimony whereof I have signed my name to this specification in the presence of two subscribing witnesses.

WILLIAM FRED. WINEBERGER.

Witnesses:
JOS. P. LIVERMORE,
W. H. SIGSTON.